July 2, 1929.  H. B. BURT  1,718,997
FROZEN CONFECTION
Filed Jan. 30, 1922
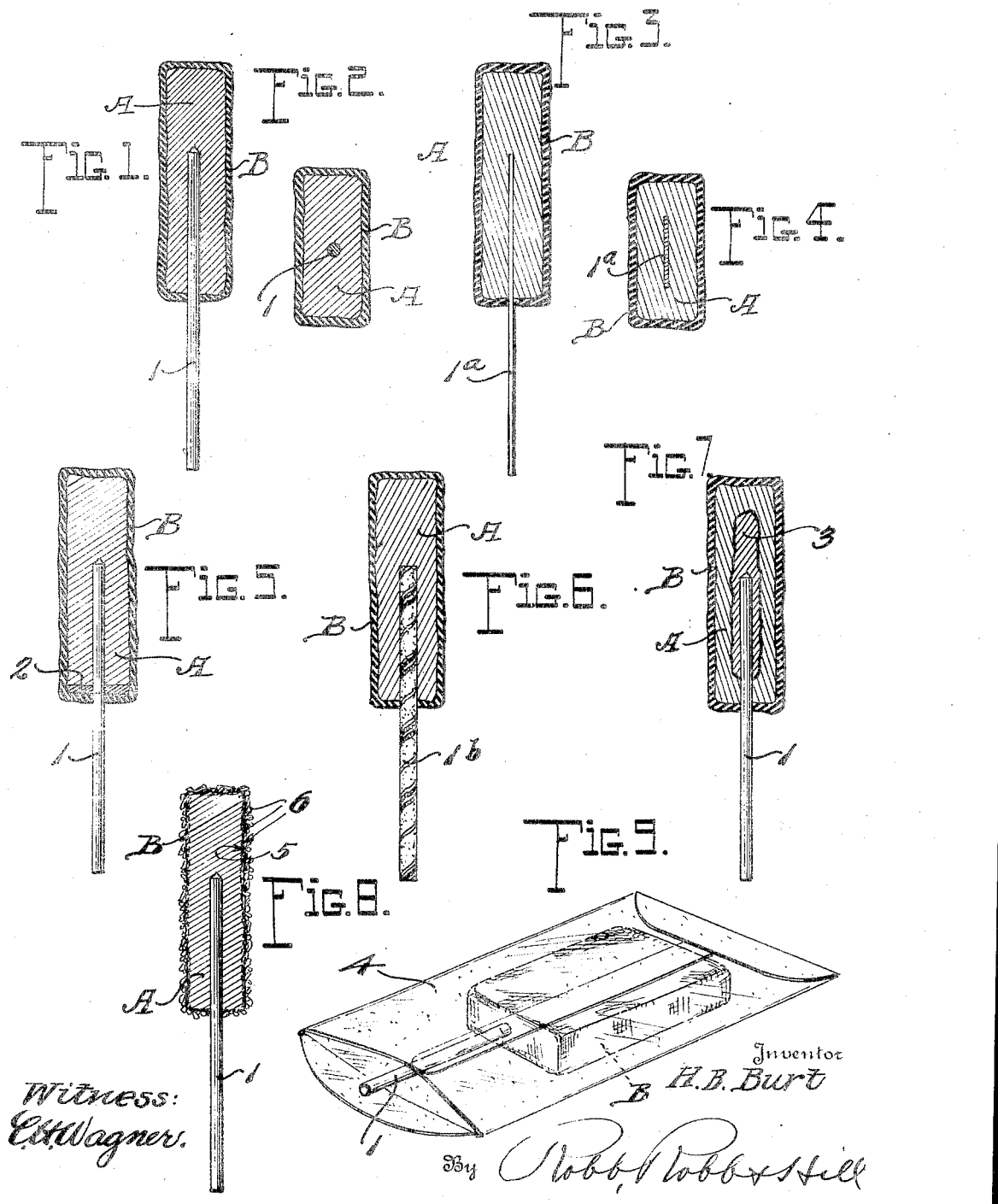

Patented July 2, 1929.

1,718,997

UNITED STATES PATENT OFFICE.

HARRY B. BURT, OF YOUNGSTOWN, OHIO; CORA W. BURT AND THE DOLLAR SAVINGS AND TRUST COMPANY, EXECUTORS OF THE WILL OF SAID HARRY B. BURT, DECEASED, ASSIGNORS TO CORA W. BURT.

FROZEN CONFECTION.

Application filed January 30, 1922. Serial No. 532,810.

The present invention relates in general to food products, and more particularly to a confection which has a body portion composed of some frozen food stuff such as ice cream, sherbet, or the like, which is soft or fluid at normal temperatures.

Among the objects of the invention is to provide a confection of this character which has novel means associated therewith for handling the same whereby it can be both handled and eaten without the necessity of touching it with the fingers and without any need for a spoon or dish. To this end a handle member, which may in some instances be of edible material, is applied to the frozen body so as to be securely attached thereto in some appropriate manner, preferably by congelation. From a hygienic and sanitary standpoint this is a very important feature, since it is not necessary for the confection to be touched by the human hand either during the manufacture thereof or while being handled by the dealer or eaten by the consumer.

A further object of the invention is to provide a novel confection of this character in which the frozen body portion or heart is enclosed and protected by a surrounding wall of coating of some edible material such as chocolate candy, or a mixture of chocolate and nuts, which is hard at normal temperatures and may be of such a character as to give the confection a delightful flavor.

Furthermore, the edible shell has a hard outer surface which at normal temperatures will not stick to the hands or to a wrapper, thereby enabling the confection to be both handled like candy and eaten like candy.

For a full understanding of the new frozen confection and a detailed disclosure of a few preferred embodiments thereof, reference is to be had to the following description and accompanying drawings, in which:

Figure 1 is a longitudinal sectional view through a frozen confection embodying this invention.

Figure 2 is a transverse section on the line 2—2 of Figure 1.

Figure 3 is a view similar to Figure 1, showing a modification.

Figure 4 is a transverse section on the line 4—4 of Figure 3.

Figures 5, 6, 7 and 8 are sectional views showing further modifications of the invention.

Figure 9 is a perspective view showing the confection as inclosed in an appropriate wrapper.

In all of the different embodiments of the invention shown by the several views of the drawings, the reference character A designates the body portion or core of the confection, and B an edible coating or shell which envelops and practically hermetically seals the body portion. The said body portion is composed of some material, such as ice cream, sherbet, ices, or the like, which is soft or fluid at normal temperatures and becomes hardened when subjected to refrigeration and frozen. The edible shell may be composed of any suitable material such as chocolate, which will provide a relatively hard outer surface at normal temperatures. When chocolate is used the frozen body portion is preferably dipped in the heated chocolate in substantially the same way that other candies and confections are dipped. The outer surface of the chocolate shell becomes hard so that at normal temperatures it will not stick to the fingers or to a wrapper, thereby enabling the confection to be handled and eaten in much the same way that other candy is handled and eaten.

An essential feature of the invention resides in providing this frozen confection with a handle member by means of which it can be manipulated without touching it with the fingers. In Figures 1 and 2 of the drawings the handle is in the form of a round wooden stick 1 which has one end thereof embedded in the frozen body A and firmly attached thereto by congelation. The other end of the stick 1 projects from the body and constitutes the handle member. This stick may be applied to the body A while the latter is soft and before it becomes hard. I have found that one satisfactory manner of attaching the stick to the body is to apply it to the body A while the said body is partially frozen and still soft, the stick being held in proper position while the freezing is completed and until the body becomes hard. The completion of the freezing process with the stick in position causes the stick to be firmly attached to the frozen body by congelation. The projecting end of the stick then forms a handle by means of which the frozen body can be manipulated when dipping it in the chocolate or otherwise applying the edible outer protecting shell B thereto, as well as when eating the same.

A slight modification is shown by Figures 3 and 4 in which the handle is formed of a stick 1ᵃ which is flat instead of round. The flattened form of the stick may be found advantageous under certain conditions, since it presents an increased surface for engagement with the material of the frozen body A by congelation and thus may result in a firmer union or adherence between the handle member and the body.

Another slight modification is shown by Figure 5, in which a wafer 2 is arranged at the base of the frozen body A, being penetrated and practically impaled upon the stick 1. This wafer member 2 may be formed of any suitable material and may be either a bakery product or a candy product. It is firmly engaged by the stick 1 and extends under the entire base of the frozen body A so that it may assist in supporting the body portion in the event the material of which it is formed becomes softer than is desirable or is really permitted under normal conditions. The edible outer coating B may or may not extend around the wafer base member 2.

A still further modification is shown by Figure 6 in which the handle is composed of a stick 1ᵇ of some edible substance such as candy. The frozen body portion A will attach itself readily to the candy stick by congelation, and with this form of the invention the entire confection, including the handle, is edible.

Still another way of making the confection is shown by Figure 7, in which the handle member is in the form of the well known candy sucker, being a stick 1 with a candy head 3 on the end thereof. The candy head 3 of the sucker is embedded in the frozen body portion A, being inserted in place while the body portion is soft and held in position until the freezing has been completed, whereupon the candy member 3 is firmly embedded in the heart of the then frozen and hardened body portion. After the ice cream has been eaten the candy sucker remains for consumption in the usual manner.

After the edible outer coating or shell B has been applied and given an opportunity to become chilled and hardened, the confection may, if desired, be placed in a suitable wrapper, such as the semitransparent waxed or glazed paper envelope indicated at 4. The chocolate shell B prevents the ice cream or frozen body portion from sticking to the wrapper or bag and enables the confection to be handled and eaten without any stickiness or muss.

Another form of the invention is shown by Figure 8, in which the outer shell B is formed of a number of granules 6 which may be of any suitable substance such as chocolate, candy, nuts, or the like, and which are caused to adhere to the surface of the frozen body A by congelation or by the use of some substance which will impart adhesive qualities to the surface of the body portion. The frozen body portion may be dipped in clear cream, edible gelatin, or other like substance, indicated at 8 on the drawings, or slightly softened by warmth, immediately after which the granular particles 6 may be applied. The particles 6 will adhere to the surface of the frozen body and the confections are then placed in a refrigerating chamber or otherwise chilled to bring about a firm adherence of the particles 6 to the body A by congelation and leave the confection with a hard and dry surface. The outer shell B need not be sustaining or form retaining, but is of such a material as to flavor the confection and impart a comparatively hard protective covering to the body A so that it will not stick to the fingers or to a wrapper and can be handled and eaten without any stickiness or muss.

It will thus be seen that the function of the outer protecting shell or covering B is not primarily to hold the body A in shape, since if it is properly prepared and frozen this is not necessary, but rather to provide a non-sticky covering so that the confection can be handled and eaten like any other candy, and at the same time to provide a pleasant flavoring for the ice cream or other frozen body portion A. No special compound or composition of the chocolate is necessary and the usual milk chocolate which is used for dipping other candies can be used for dipping or preparing these confections with excellent results.

Having thus described my invention, what I claim as new and desire to secure by Letters Patent is:

1. A frozen confectionery product including a frozen body portion formed of an edible substance which is fluid at normal temperatures and congeals by refrigeration, and a stick member partially embedded in the body portion and attached thereto by congelation, the projecting end of the stick member forming a handle.

2. A frozen confectionery product including a frozen body portion formed of an edible substance which is fluid at normal temperatures and congeals by refrigeration, and a handle member formed of hard candy and attached to the body portion by congelation.

3. A frozen confectionery product including a frozen ice cream body portion, and a stick having one end thereof embedded in the ice cream body portion, the other end of the stick projecting from the body portion and forming a handle by means of which the ice cream body portion can be held while being eaten.

4. A frozen confectionery product including a frozen ice cream body portion, and a stick of hard candy having one end thereof embedded in the ice cream body portion, the opposite end of the candy stick projecting from the body portion forming a handle by means of which the ice cream body portion can be held while being eaten.

5. A frozen confectionery product including a frozen ice cream body portion, a penetrating handle member attached to the body portion, and an outer protective covering surrounding the body portion and formed of edible substance which is comparatively hard and non-sticky at normal temperatures.

6. A frozen confectionery product including an ice cream body portion, a handle member attached to the body portion, and an outer covering surrounding the body portion and formed of granulated particles of an edible substance which is comparatively hard and non-sticky at normal temperatures.

7. A frozen confectionery product including a frozen body portion formed of an edible substance which is fluid at normal temperatures and congeals by refrigeration, and a stick member partially embedded in the body portion and upon which the body portion is congealed, the projecting end of the stick member forming a handle and the entire surface of the confection being completely exposed while being eaten.

In testimony whereof I affix my signature.

HARRY B. BURT.